US009279318B2

(12) United States Patent
Hay et al.

(10) Patent No.: US 9,279,318 B2
(45) Date of Patent: Mar. 8, 2016

(54) SYSTEMS AND METHODS FOR AUTOMATIC WEIGHT ON BIT SENSOR CALIBRATION AND REGULATING BUCKLING OF A DRILLSTRING

(71) Applicant: Halliburton Energy Services, Inc., Houston, TX (US)

(72) Inventors: Richard T. Hay, Spring, TX (US); Robello Samuel, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 22 days.

(21) Appl. No.: 14/347,363

(22) PCT Filed: Dec. 28, 2012

(86) PCT No.: PCT/US2012/071917
§ 371 (c)(1),
(2) Date: Mar. 26, 2014

(87) PCT Pub. No.: WO2013/101984
PCT Pub. Date: Jul. 4, 2013

(65) Prior Publication Data
US 2014/0231141 A1 Aug. 21, 2014

Related U.S. Application Data

(60) Provisional application No. 61/580,933, filed on Dec. 28, 2011.

(51) Int. Cl.
*G01V 1/40* (2006.01)
*E21B 47/00* (2012.01)
(Continued)

(52) U.S. Cl.
CPC ............... *E21B 47/00* (2013.01); *E21B 44/00* (2013.01); *E21B 47/0006* (2013.01); *E21B 47/024* (2013.01); *G01G 9/00* (2013.01)

(58) Field of Classification Search
CPC ..... E21B 44/00; E21B 47/0006; E21B 47/00; E21B 47/024; G01G 9/00

USPC ............................................................ 702/9
See application file for complete search history.

(56) References Cited

U.S. PATENT DOCUMENTS 5,311,952 A * 5/1994 Eddison et al. ................. 175/61
5,778,992 A * 7/1998 Fuller ............................. 175/73
(Continued)

OTHER PUBLICATIONS

Mahmoud Lotfy ElGizawy, Continuous Measurement-While-Drilling Surveying System Utilizing MEMS Inertial Sensors, Feb. 2009, UCGE Reports No. 20284, URL: http://www.geomatics.ucalgary.ca/research/publications.*

(Continued)

*Primary Examiner* — Tung S Lau
*Assistant Examiner* — Xiuquin Sun
(74) *Attorney, Agent, or Firm* — McDermott Will & Emery LLP; Scott Brown

(57) ABSTRACT

Disclosed are systems and methods for automatic weight on bit sensor calibration and regulating buckling of a drillstring. One method includes taking a first survey recording at a first depth within a borehole, the first survey recording providing inclination and azimuth of a drillstring at the first depth, measuring a weight on a drill bit at the first depth with a sensor sub arranged on a bottom hole assembly, the bottom hole assembly forming part of the drillstring and the drill bit being disposed at an end of the drillstring, calculating a predicted borehole curvature at a second depth within the borehole, the predicted curvature including a predicted inclination and a predicted azimuth of the drillstring at the second depth, calculating a weight correction value based on the predicted hole curvature, and calibrating the sensor sub with the weight correction value.

21 Claims, 5 Drawing Sheets

(51) Int. Cl.
*E21B 44/00* (2006.01)
*E21B 47/024* (2006.01)
*G01G 9/00* (2006.01)

(56) References Cited

U.S. PATENT DOCUMENTS

| | | | | |
|---|---|---|---|---|
| 8,245,792 B2* | 8/2012 | Trinh et al. | ...... | 175/40 |
| 8,381,839 B2* | 2/2013 | Rosenhauch | ...... | 175/95 |
| 2010/0051292 A1 | 3/2010 | Trinh et al. | | |
| 2011/0220410 A1* | 9/2011 | Aldred et al. | ...... | 175/26 |
| 2011/0272195 A1 | 11/2011 | Trinh et al. | | |
| 2012/0016589 A1* | 1/2012 | Li et al. | ...... | 702/9 |
| 2012/0261190 A1* | 10/2012 | Krueger et al. | ...... | 175/24 |

OTHER PUBLICATIONS

Sawaryn et al., "A Compendium of Directional Calculations Based on the Minimum Curvature Method," SPE Drilling & Completion, 2005, SPE 84246.

International Search Report and Written Opinion for PCT/US2012/071917 dated Jan. 27, 2014.

\* cited by examiner

SYSTEMS AND METHODS FOR AUTOMATIC WEIGHT ON BIT SENSOR CALIBRATION AND REGULATING BUCKLING OF A DRILLSTRING

This application is a National Stage entry of and claims priority to International Application No. PCT/US2012/071917, filed on Dec. 28, 2012, which claims priority to U.S. Provisional Patent App. No. 61/580,933, filed on Dec. 28, 2011.

BACKGROUND

The present disclosure relates to measuring while drilling techniques and, more particularly, to systems and methods for automatic weight on bit sensor calibration and regulating buckling of a drillstring.

To obtain hydrocarbons such as oil and gas, boreholes are drilled by rotating a drill bit attached at a drillstring end. A large proportion of the current drilling activity involves directional drilling; i.e., drilling deviated and/or horizontal boreholes, to increase the hydrocarbon production from subterranean formations. Modern directional drilling systems generally employ a drillstring having a bottom-hole assembly (BHA) and a drill bit situated at an end thereof that may be rotated by rotating the drillstring from the surface, using a mud motor (i.e., downhole motor) arranged downhole near the drill bit, or a combination of the mud motor and rotation of the drillstring from the surface. Pressurized drilling fluid, commonly referred to as "mud" or "drilling mud," is pumped into the drill pipe to cool the drill bit and flush cuttings and particulates back to the surface for processing. The mud may also be used to rotate the mud motor and thereby rotate the drill bit.

The BHA generally includes a number of downhole devices placed in close proximity to the drill bit and configured to measure certain downhole operating parameters associated with the drillstring and drill bit. Such devices typically include sensors for measuring downhole temperature and pressure, azimuth and inclination measuring devices, and a resistivity measuring device to determine the presence of hydrocarbons and water. Additional downhole instruments, known as logging-while-drilling ("LWD") and measuring-while-drilling ("MWD") tools, are frequently attached to the drillstring to determine the formation geology and formation fluid conditions during the drilling operations.

Boreholes are usually drilled along predetermined paths and the drilling of a typical borehole proceeds through various formations. To optimize drilling operations, a drilling operator at the surface controls the surface-controlled drilling parameters, such as weight on bit, drilling fluid flow through the drill pipe, the drillstring rotational speed, and the density and viscosity of the drilling fluid. The downhole operating conditions continually change and the drilling operator must be able to react to such changes and adjust the surface-controlled parameters to optimize the drilling operations.

During drilling operations, gravity and hole curvature directly impact drilling performance as related to accurately determining the true weight that is applied on the drill bit. Without knowing the masking effects created by gravity and hole curvature it can become extremely difficult to determine whether weight is being applied to the bottom of the hole correctly. At least one problem encountered is not knowing the true hole curvature, inclination, and azimuth until after a survey probe attached to the BHA measures the hole inclination and azimuth at a new depth. Until the survey probe reaches that depth, there is a depth lag in data in knowing just exactly what the hole curvature is from the point of the survey measurement to the bottom of the hole. Currently, it is believed that there is no way of knowing what the true hole curvature, azimuth, and inclination is below the survey probe or instrument.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

SUMMARY OF THE DISCLOSURE

Figure 1:
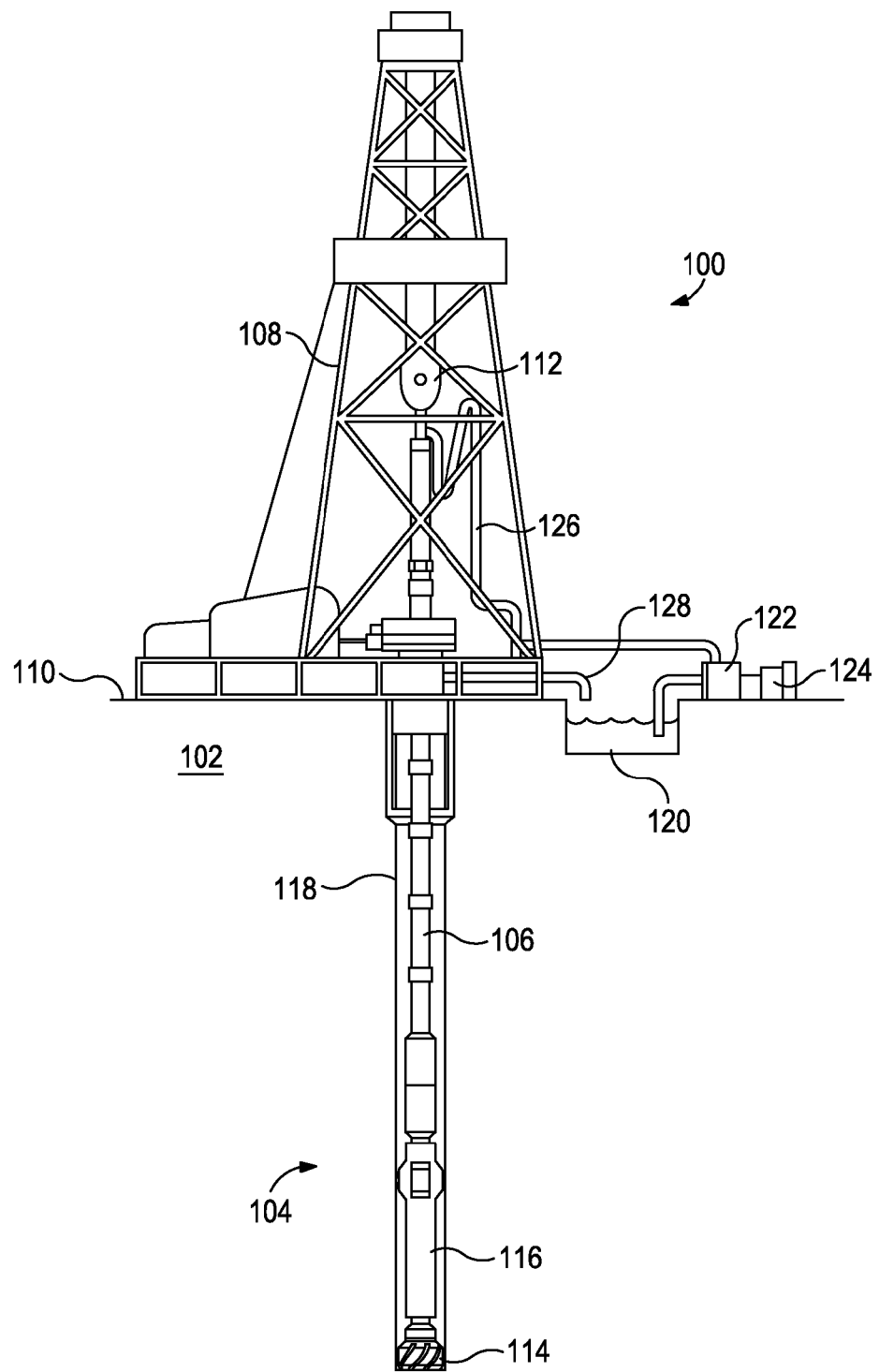
FIG. 1 illustrates a drilling system, according to an embodiment of the disclosure.

The present disclosure relates to measuring while drilling techniques and, more particularly, to systems and methods for automatic weight on bit sensor calibration and regulating buckling of a drillstring.

In some embodiments, a method for optimizing weight measurements in drilling operations is disclosed. The method may include taking a first survey recording at a first depth within a borehole, the first survey recording providing inclination and azimuth of a drillstring at the first depth, measuring a weight on a drill bit at the first depth with a sensor sub arranged on a bottom hole assembly, the bottom hole assembly forming part of the drillstring and the drill bit being disposed at an end of the drillstring, calculating a predicted borehole curvature at a second depth within the borehole, the predicted curvature including a predicted inclination and a predicted azimuth of the drillstring at the second depth, calculating a weight correction value based on the predicted hole curvature, and calibrating the sensor sub with the weight correction value.

In other embodiments, a system for optimizing weight measurements in drilling operations is disclosed. The system may include a bottom hole assembly coupled to a drillstring extended into a borehole, one or more survey probes arranged on the bottom hole assembly and configured to take a first survey recording at a first depth within the borehole, the first survey recording providing inclination and azimuth of the drillstring at the first depth, a sensor sub arranged on the bottom hole assembly and configured to measure a weight on the drill bit at the first depth, a data acquisition system communicably coupled to the one or more survey probes and the sensor sub and able to receive and process the first survey recording and the weight on the drill bit, and a weight and torque corrective model communicably coupled to the data acquisition system and having one or more processors configured to calculate a predicted borehole curvature at a second depth within the borehole and calculate a weight correction value based on the predicted hole curvature, the weight correction value being used to calibrate the sensor sub.

The features of the present disclosure will be readily apparent to those skilled in the art upon a reading of the description of the preferred embodiments that follows.

DETAILED DESCRIPTION

The present disclosure relates to measuring while drilling techniques and, more particularly, to systems and methods for automatic weight on bit sensor calibration and regulating buckling of a drillstring.

The embodiments disclosed herein provide methods for correcting weight measurements based upon estimated projection to the bit calculations to estimate a correction to the applied weight until the true hole curvature is known. Once the true hole curvature is known, the previous estimated values may be revised to the actual values, thus revising or otherwise reassessing previously accepted data that was based solely on a predictive model. As will be appreciated, this may reduce the error of knowing the actual bit face contact force. Moreover, by following the exemplary methods described herein, one can automatically correct sensor weight measurements on the fly through predictive techniques, thereby reducing the number of times required to stop and re-calibrate the weight measurement device. As will be appreciated, this may prove advantageous in saving rig time and cost per foot by not having to re-calibrate but may also improve drilling efficiency and run life by more effectively managing the true applied weight to the drill bit face.

By calibrating and re-calibrating the weight sensor(s) to provide a more accurate weight on bit (WOB) reading, the mechanical efficiency of the drill bit can be more accurately evaluated to see how well the drill bit is operating. For example, a WOB measurement that is higher than the true WOB may lead an operator to conclude that the drill bit is becoming dull or that the rock is harder than it actually is. Such conclusions could lead to early replacement of the drill bit. Conversely, a WOB measurement that is lower than the true WOB could lead an operator to incorrectly conclude that the rock is softer than it actually is. Where the WOB is unrecognized by the operator, such a conclusion could lead to a damaged or broken bottom-hole assembly, including the bit, damaged or broken bearings and/or a stalled or damaged mud motor. Thus, more accurate WOB determinations can improve reliability and allow the operator to stay within operating limits and make better informed decisions, particularly when drilling directional wells. In addition, a more accurate WOB can be used to increase steering performance and optimize drilling speeds.

Moreover, a more accurate WOB reading can be used to optimize drilling in a variety of other ways as well. For example, the operator can draw more accurate conclusions about downhole conditions in order to maintain optimal drilling parameters. Further, a more accurate WOB reading can be used to recommend or make changes in drilling parameters in automated traction and drilling systems, with or without the intervention of an operator.

The systems employing the exemplary methods described herein can be pro-active in sensing or predicting drilling problems before the drilling application becomes a fishing or cementing job. Furthermore, drill bit deflections can be more easily detected with the exemplary methods described herein, thereby minimizing or otherwise eliminating altogether costly side tracks or worse. The disclosed methods may also evolve into the basis for an automated drilling platform. By taking the burden of maintaining drilling parameters in appropriate ranges off of the driller and directional driller, more time is left for human analysis of the data and better judgment based upon better data.

Referring to FIG. 1, illustrated is an exemplary drilling system 100, that may be used in concert with one or more embodiments of the present disclosure. Boreholes may be created by drilling into the earth 102 using the drilling system 100. The drilling system 100 may be configured to drive a bottom hole assembly (BHA) 104 positioned or otherwise arranged at the bottom of a drillstring 106 extended into the earth 102 from a derrick 108 arranged at the surface 110. The derrick 108 includes a kelly 112 used to lower and raise the drillstring 106.

The BHA 104 may include a drill bit 114 and a tool string 116 which may be moved axially within a drilled wellbore 118 as attached to the drillstring 106. During operation, the drill bit 114 may be provided with sufficient weight on bit (WOB) and torque on bit (TOB) from the surface 110 in order to penetrate the earth 102 and thereby create the wellbore 118. The BHA 104 may also provide directional control of the drill bit 114 as it advances into the earth 102. The tool string 116 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within the tool string 116, as shown in FIG. 1.

Fluid or "mud" from a mud tank 120 may be pumped downhole using a mud pump 122 that may be powered by an adjacent power source, such as a prime mover or motor 124. The mud may be pumped from the mud tank 120, through a stand pipe 126, which feeds the mud into the drillstring 106 and conveys the same to the drill bit 114. The mud exits one or more nozzles arranged in the drill bit 114 and in the process cools the drill bit 114. After exiting from the drill bit 114, the mud circulates back to the surface 110 via the annulus defined between the wellbore 118 and the drillstring 106, and in the process returns drill cuttings and debris, such as sand and shale, to the surface. The cuttings and mud mixture are passed through a flow line 128 and into a shaker and optional centrifuge (not shown), which separates the majority of solids, such as cuttings and fines, from the mud, and returns the cleaned mud down hole through stand pipe 126 once again. Changes to various drilling parameters, such as change in rate of penetration (ROP) into the earth 102, can be observed, analyzed, and accounted for during this process.

Although the drilling system 100 is shown and described with respect to a rotary drill system in FIG. 1, those skilled in the art will readily appreciate that many types of drilling systems can be employed in carrying out embodiments of the disclosure. For instance, drills and drill rigs used in embodiments of the disclosure may be used onshore (as depicted in FIG. 1) or offshore (not shown). Offshore oil rigs that may be used in accordance with embodiments of the disclosure include, for example, floaters, fixed platforms, gravity-based structures, drill ships, semi-submersible platforms, jack-up drilling rigs, tension-leg platforms, and the like. It will be appreciated that embodiments of the disclosure can be applied to rigs ranging anywhere from small in size and portable, to bulky and permanent.

Further, although described herein with respect to oil drilling, various embodiments of the disclosure may be used in many other applications. For example, disclosed methods can be used in drilling for mineral exploration, environmental investigation, natural gas extraction, underground installation, mining operations, water wells, geothermal wells, and the like. Further, embodiments of the disclosure may be used in weight-on-packers assemblies, in running liner hangers, in running completion strings, etc., without departing from the scope of the disclosure.

Figure 2:
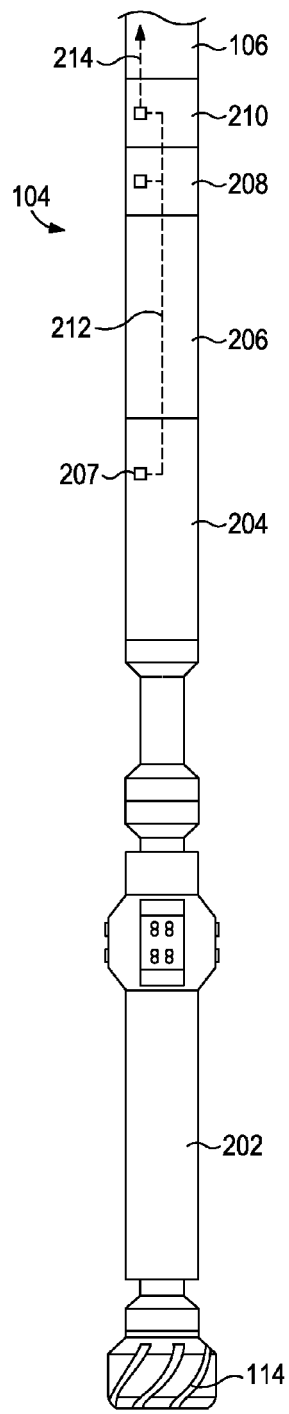
FIG. 2 illustrates an exemplary bottom hole assembly, according to one or more embodiments of the present disclosure.

Referring now to FIG. 2, with continued reference to FIG. 1, illustrated is an exemplary bottom hole assembly (BHA) 104 that can be employed in concert with one or more embodiments of the present disclosure. Although described throughout with respect to a BHA, the embodiments described herein can be alternatively or additionally applied at multiple locations throughout a drillstring, and are therefore not limited to the generalized location of a conventional BHA (i.e., bottom of a drillstring). As shown, the BHA 104 may include the drill bit 114, a rotary steerable tool 202, an MWD/LWD tool 204, and a drill collar 206.

The MWD/LWD tool 204 may include an MWD sensor package that may include one or more survey probes 207 configured to collect and transmit directional information, mechanical information, formation information, and the like. In particular, the one or more survey probes 207 may include one or more internal or external sensors such as, but not limited to, an inclinometer, one or more magnetometers, (i.e., compass units), one or more accelerometers, a shaft position sensor, combinations thereof, and the like. The distance between the survey probes 207 and the drill bit 114 can be any axial length required for the particular wellbore application. In some embodiments, for example, the distance between the survey probes 207 and the drill bit 114 can range from about 45 ft to about 100 ft. Directional information (i.e., wellbore trajectory in three-dimensional space) of the BHA 104 within the earth 102 (FIG. 1), such as inclination and azimuth, may be obtained in real-time using the survey probes 207.

The MWD/LWD tool 204 may further include an LWD sensor package that may include one or more sensors configured to measure formation parameters such as resistivity, porosity, sonic propagation velocity, or gamma ray transmissibility. In some embodiments, the MWD and LWD tools, and their related sensor packages, may be in communication with one another to share collected data therebetween. The MWD/LWD tool 204 can be battery driven or generator driven, as known in the art, and any measurements obtained from the MWD/LWD tool 204 can be processed at the surface 110 (FIG. 1) and/or at a downhole location.

The drill collar 206 may be configured to add weight to the BHA 104 above the drill bit 114 so that there is sufficient weight on the drill bit 114 to drill through the requisite geological formations. In other embodiments, weight is also applied to the drill bit 114 through the drillstring 106 as extended from the surface 110. Weight may be added or removed to/from the drill bit 114 during operation in order to optimize drilling performance and efficiency. For example, as described in greater detail below, the curvature of the borehole may be predicted and the weight applied to the drill bit 114 may be optimized in order to take into account drag forces or friction caused by the curvature. As will be appreciated, increased amounts of drag forces will be present where the borehole curvature is more dramatic.

The BHA 104 may further include a sensor sub 208 coupled to or otherwise forming part of the BHA 104. The sensor sub 208 may be configured to monitor various operational parameters in the downhole environment with respect to the BHA 104. For instance, the sensor sub 208 may be configured to monitor operational parameters of the drill bit 114 such as, but not limited to, weight-on-bit (WOB), torque-on-bit (TOB), rotations per minute (RPM) of the drill bit 114, bending moment of the drillstring 106, vibration potentially affecting the drill bit 114, and the like. As illustrated, the sensor sub 208 may be arranged uphole from the MWD/LWD tool 204 and the drill collar 206. In other embodiments, however, the sensor sub 208 may be arranged at any location along the BHA 104 without departing from the scope of the disclosure.

In some embodiments, the sensor sub 208 may be a DRILLDOC® tool commercially-available from Sperry Drilling of Houston, Tex., USA. The DRILLDOC® tool, or another similar type of sensor sub 208, may be configured to provide real-time measurements of weight, torque and bending on an adjacent cutting tool (i.e., the drill bit 114) and/or drillstring 106 to characterize the transfer of energy from the surface to the cutting tool and/or drillstring 106. As will be appreciated, these measurements help optimize drilling parameters to maximize performance and minimize wasted energy transfer and vibration.

The BHA 104 may further include a bi-directional communications module 210 coupled to or otherwise forming part of the drillstring 106. The communications module 210 may be communicably coupled to each of the sensor sub 208 and the MWD/LWD tool 204 (e.g., its survey probe(s) 207) via one or more communication lines 212 such that the communications module 210 may be configured to send and receive data to/from the sensor sub 208 and the MWD/LWD tool 204 in real time.

The communications module 210 may further be communicably coupled to the surface (not shown) via one or more communication lines 214 such that the communications module 210 may be able to send and receive data in real time to/from the surface 110 (FIG. 1) during operation. For instance, the communications module 210 may be configured to communicate to the surface 110 various downhole operational parameter data as acquired via the sensor sub 208 and the MWD/LWD tool 204. In other embodiments, however, the communications module 210 may communicate with a computerized system (not shown) or the like configured to receive the various downhole operational parameter data as acquired through the sensor sub 208 and the MWD/LWD tool 204. As will be appreciated, such a computerized system may be arranged either downhole or at the surface 110.

The communication lines 212, 214 may be any type of wired telecommunications devices or means known to those skilled in the art such as, but not limited to, electric wires or lines, fiber optic lines, etc. For instance, in some embodiments, a wired drill pipe (not shown) may be used for two-way data transmission between the surface 110 and the communications module 210. Using a wired drill pipe, the BHA 104 and the drillstring 106 may have electrical wires built in to one or more of their components such that measurements and signals from the MWD/LWD tool 204 and the sensor sub 208 may be carried directly to the surface 110 at high data transmission rates. As will be appreciated, signal wires can be incorporated into wirelines, coiled tubing, or slicklines, as known in the art, to directly transmit signals to the surface 110 for consideration. Alternatively or additionally, the communications module 210 may include or otherwise be a telemetry module used to transmit measurements to the surface 110 wirelessly, if desired, using one or more downhole telemetry techniques including, but not limited to, mud pulse, acoustic, electromagnetic frequency, combinations thereof, and the like.

Since the sensor sub 208 is not arranged at the bottom of the BHA 104, or axially adjacent the drill bit 114, changes in hole curvature (e.g., inclination and azimuth) may skew the WOB measurement if the sensor sub 208 is not properly calibrated. In addition, buoyancy, drag, and mud flow rate can all affect the measurement of the sensor sub 208 if it is not calibrated. According to the present disclosure, the WOB as measured by the sensor sub 208 may be automatically updated or otherwise compensated for as based on, for example, one or more of mass, hole curvature, friction (e.g., drag effects caused by hole curvature and the like), buoyancy, pipe pressure, and mud flow, thereby resulting in a more accurate applied WOB measurement at various hole curvatures. This measurement can be observed by removing some of the effects masking the actual force being applied to the axial face of the drill bit 114.

When not properly calibrated, the WOB as detected by the sensor sub 208 may not account for hole curvature, and therefore may be inaccurate. To reduce the severity of inaccurate readings from an un-calibrated sensor sub 208, frequent bias correction measurements may be made when the hole curvature changes or is predicted to change. Embodiments of the disclosure avoid this necessity by automatically compensating sensor sub 208 measurements based on a predicted hole curvature and its resulting drag effects. Thus, the frequency of tare measurements can be greatly reduced, and less "bumping" in data values will be observed when new tare values are introduced. Constant tare measurements can be made "on the fly" using embodiments of the disclosure while simultaneously drilling or moving the drillstring 106. Application of such embodiments ultimately save rig time and costs by reducing time spent calibrating the sensor sub 208 over the drill run, thus optimizing drilling operations.

According to the exemplary methods disclosed herein, WOB measurement data may be automatically processed and otherwise revised while drilling by factoring out the effects of gravity (e.g., drag effects or friction) as resulting from a predicted hole curvature in order to maintain a true weight applied to the drillstring 106 and acting on the drill bit 114. While both effects contribute to the sensor sub 208 measurement, it is possible to subtract out their effects in order to determine what the actual load is being applied to the face of the drill bit 114 itself. By knowing the actual weight being applied to the drill bit, an operator may be able to intelligently determine whether more or less weight needs to be applied to the drillstring 106 in order to maintain drilling forces in an optimal range and thereby maximize the rate of penetration. Those skilled in the art will readily appreciate that measuring such corrective values on the fly may prove advantageous in providing valuable diagnostic data in assessing the overall drilling conditions and drilling performance.

In addition, by calibrating the sensor sub 208 to provide a more accurate WOB reading, the mechanical efficiency of the drill bit 114 can be more accurately evaluated to see how well it is operating. More accurate WOB determinations can improve reliability and allow the operator to stay within operating limits and make better informed decisions, particularly when drilling directional wells. In addition, a more accurate WOB measurement can be used to increase steering performance, optimize drilling speed and minimize cost per foot. A more accurate WOB reading can be used to optimize drilling in a variety of other ways as well. For example, the operator can draw more accurate conclusions about downhole conditions in order to maintain optimal drilling parameters. Further, a more accurate WOB reading can be used to recommend or make changes in drilling parameters in automated traction and drilling systems, with or without the intervention of an operator.

The present methods and systems incorporate predictive modeling in an attempt to reduce WOB errors. The method is designed to work with the directional driller rather than against him and is intended to provide an intuitive worst case, best case, and likely result so the directional driller at all times can be made aware of the possible variance faced when making steering decisions. By understanding the possible variance, the magnitude of critical steering deviations can be predicted in advance and decisions made to reduce risk where possible before the steering becomes a failure, thereby potentially resulting in and requiring costly remediation efforts.

Figure 3A:
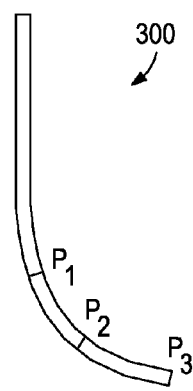
FIGS. 3A-3D illustrate progressive views of a borehole showing the process for correcting weight on bit using actual and predictive calculations, according to one or more embodiments.

Referring now to FIGS. 3A-3D, with continued reference to FIG. 2, illustrated are progressive views of an exemplary borehole 300 showing the process for correcting WOB using actual and predictive calculations, according to one or more embodiments. The interval or zone above point $P_1$ in the bore hole 300 is the zone where weight measurements have already been corrected based upon definitive survey results as logged by the one or more survey probes 207 of the WMD/LWD tool 204. In FIG. 3A the interval between point $P_1$ and point $P_2$ is a course length that has been drilled and points $P_1$ and $P_2$ represent survey points providing borehole data at the start and end, respectively, of the course length. Surveys of the borehole 300 at each of points $P_1$ and $P_2$ may be made using the survey probes 207, as generally discussed above. Accordingly, the survey information between points $P_1$ and $P_2$ of the borehole represent actual measurements of the borehole 300 that may be taken into consideration by the operator at the surface 110 (FIG. 1).

The interval between point $P_2$ and point $P_3$ may represent a zone where modeling, according to the embodiments discussed herein, is used to predict the hole curvature and its potential effects on the WOB as measured by the sensor sub 208. The distance to the bottom of the BHA 104 from the survey probe is essentially $P_3-P_2$, and this represents the minimum distance the operator has to move the drillstring 106 in order to equal the length of the BHA 104 from the survey probe 207 to the bottom of the drill bit 114.

Point $P_3$ may be determined by calculating a predicted hole curvature for the course length between point $P_2$ and point $P_3$. This may be accomplished using a variety of projection to the bit surveying techniques which provide or otherwise calculate a predicted borehole position. In some embodiments, such calculations may be processed by employing one or more weight and torque corrective models, such as MAX-BHA™, a software program commercially-available through Sperry Drilling Services of Houston, Tex., USA. MAX-BHA™ may be stored on a non-transitory computer-readable medium containing program instructions configured to be executed by one or more processors of a computer system, and may help well operators improve well placement, drilling performance, and tool reliability through real-time modeling of critical rotary speed and sag correction of the borehole 300. Those skilled in the art will readily recognize, however, that any other known weight and torque corrective model may be used, without departing from the scope of the disclosure. The disclosed methods may use such modeling programs as an example of how the predictive method works to predict and otherwise correct WOB (and TOB in some applications).

While there are several methods available for calculating borehole 300 position, or the predicted curvature of the borehole 300, as known and recognized by those skilled in the art, the methods and/or equations for calculating borehole position used herein are used merely for demonstration purposes with the understanding that the use of other methods and equations may equally be done by those skilled in the art. One set of equations that are generally accepted by those skilled in the art, and that demonstrate the least amount of error in calculating borehole position and curvature, are derived from the Minimum Curvature Method. The Minimum Curvature Method is detailed extensively in S. J. Sawaryn and J. L. Thorogood, "A Compendium of Directional Calculation Based on the Minimum Curvature Method," *SPE Drilling and Completion*, March 2005, pp. 24-36 (SPE 84246), the contents of which are hereby incorporated by reference in their entirety.

In this survey calculation method the predicted curvature of the borehole 300 is considered to be a constant arc, or curvature, over a distance of measured depth between survey stations (i.e., the course length). More often than not, however, the borehole deviation between two survey stations is not a smooth arc but it is instead made of segments of varying curvatures. Accordingly, minimum curvature calculations may be used to represent the interval as an average of 2 minimum curves that allow for the matching of the 2 different surveys over the depth interval. The generally accepted basic equations for minimum curvature of the borehole 300 are as follows:

$$\Delta North = \frac{\Delta MD}{2}[\sin(I_1) \times \cos(A_1) + \sin(I_2) \times \cos(A_2)]\frac{2}{\beta} \times \tan\left(\frac{\beta}{2}\right)$$ Equation (1)

$$\Delta East = \frac{\Delta MD}{2}[\sin(I_1) \times \sin(A_1) + \sin(I_2) \times \sin(A_2)]\frac{2}{\beta} \times \tan\left(\frac{\beta}{2}\right)$$ Equation (2)

$$\Delta Vert = \frac{\Delta MD}{2}[\cos(I_1) + \cos(I_2)]\frac{2}{\beta} \times \tan\left(\frac{\beta}{2}\right)$$ Equation (3)

where $I_1$ is the inclination of the borehole 300 at the start point (e.g., $P_2$ in FIG. 3A), $I_2$ is the projected inclination of the borehole 300 at the end point (e.g., $P_3$ in FIG. 3A), $A_1$ is the azimuth of the borehole 300 at the start point (e.g., $P_2$ in FIG. 3A), $A_2$ is the projected azimuth of the borehole 300 at the end point (e.g., $P_3$ in FIG. 3A), $\Delta MD$ is the change in measured depth between points $P_2$ and $P_3$ in the borehole 300, and $\beta$ is the shape factor of the borehole 300. The preceding variables and their respective derivations and use may be better understood with reference to the S. J. Sawaryn and J. L. Thorogood technical paper cited and incorporated by reference above.

Equations 1-3 provide the orthogonal displacement of the drill bit 114 within the borehole 300 and the projected or predicted position of the drill bit 114 therein. The resulting predicted curvature of the borehole 300 may be obtained using the following equation:

$$K = \left(\frac{\sqrt{\Delta I^2 + \Delta A^2}}{CL}\right)$$ Equation (4)

where K is the predicted curvature; $\Delta I$ is the difference between $I_1$ and $I_2$; $\Delta A$ is the difference between $A_1$ and $A_2$; and CL is the course length (e.g., $P_2$ to $P_3$). The model, as run by MAXBHA™, for example, may be configured to provide or otherwise intelligently predict $I_2$ and $A_2$, and described in more detail below.

Figure 3B:
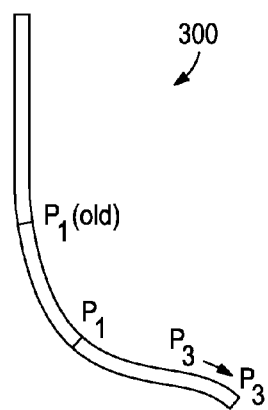

Referring to FIG. 3B, once the predicted hole curvature is determined for the course length between P2 and P3, the point P2 of FIG. 3A may be discarded and drilling may commence towards P3. In particular, the point $P_2$ from FIG. 3A may be made equivalent to a new $P_1$, and the drillstring may be moved forward along the projected course length. As shown in FIG. 3B, $P_3$ is basically the projected bottom of the BHA 104 (i.e., not necessarily the bottom of the borehole 300), so as the BHA 104 trips in, the distance from $P_1$ to $P_3$ incrementally increases. In other words, $P_3$ slides along with the bottom of the BHA 104 as it drills or trips deeper into the bore hole 300.

While the BHA 104 advances into the borehole 300, the MWD/LWD tool 204 and the sensor sub 208 may be taking real-time measurements of borehole 300 parameters, such as "true" inclination and azimuth of the borehole 300 and raw weight measurements. As will be appreciated, there is no depth lag associated with the weight and torque measured values retrieved from the sensor sub 208 as opposed to the depth lag experienced in survey measurements retrieved from the survey probes 207. Therefore, the sensor sub 208 may provide some indication of what is going on in the borehole 300 below the sensor sub 208 to the drill bit 114, whereas the survey probes 207 are only able to measure what it can observe in its localized position.

Once a raw and "true" weight measurement is received in conjunction with the "true" hole curvature, the raw data is used to correct the predictive model on steering the BHA 104, thereby updating the prediction of what the changes in the weight measurement are as drilling progresses.

Figure 3C:
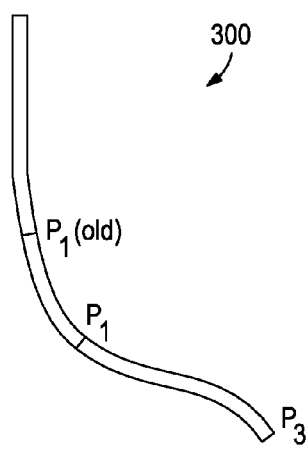
Figure 3D:
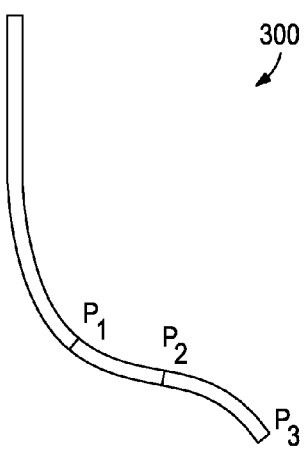

Referring to FIG. 3C, illustrated is the point in which the BHA 104 arrives at a new survey station point (shown as $P_3$) in the borehole 300. At the point $P_3$, a new survey may be taken using the survey probes 207 and, as a result, a new $P_2$ position, as described with reference to FIG. 3A, may be determined. The foregoing process may then be repeated, and the weight measurement is updated by re-processing the weight correction amounts based upon the new known hole curvature over the new course length, as shown in FIG. 3D.

Figure 4:
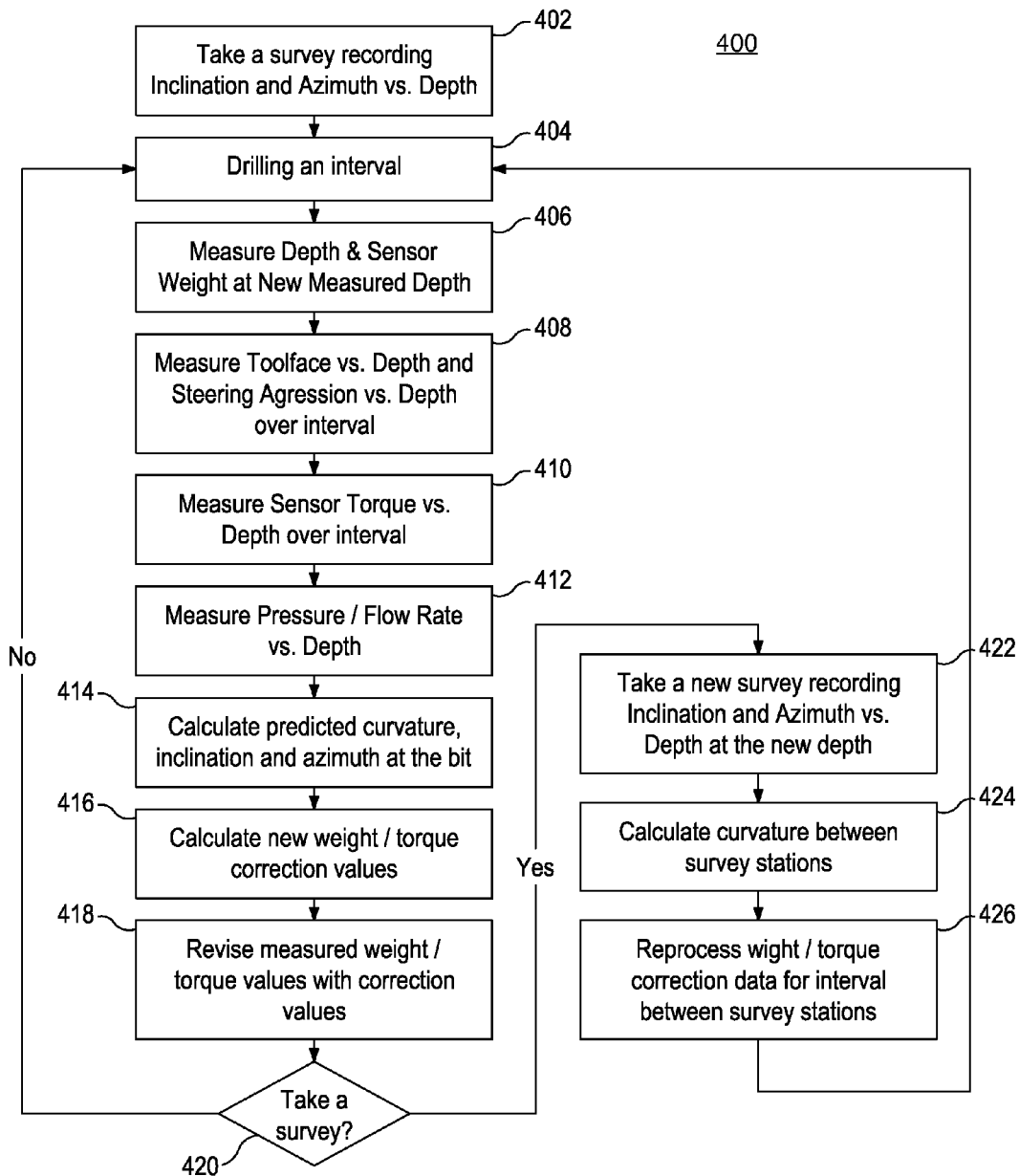
FIG. 4 illustrates a schematic flowchart of a method for extrapolating the weight along a drillstring based on the borehole curvature, according to one or more embodiments.

Referring now to FIG. 4, with continued reference to FIGS. 2 and 3, illustrated is a flowchart of a method 400 for extrapolating the weight along a drillstring based on the borehole curvature, according to one or more embodiments. As will be appreciated by those skilled in the art, several variances to the method 400 may occur without departing from the scope of the disclosure. For example, there are several ways to reduce the complexity of the method 400 depending upon the desired accuracy. If the effects of certain borehole parameters are minimal or difficult to measure, an operator may choose to ignore some elements of the method 400 and accept the variance that the resulting omission would present to the system as part of the overall system accuracy.

In some embodiments, the method 400 may include taking a survey that records inclination and azimuth of the drill string 106 at a first point or depth in the borehole 300, as at 402. In at least one embodiment, such a survey may be taken by the one or more survey probes 207 of the MWD/LWD tool 204 and the first point may be representative of $P_1$ of FIG. 3A. The method 400 may further include drilling an interval, as at 404. The interval that is drilled may encompass the course length between points $P_1$ and $P_2$ of FIG. 3A. At the new depth $P_2$, the method 400 may proceed by measuring the depth of the borehole 300 and the WOB, as at 406. As discussed above, the WOB may be measured or otherwise obtained using the sensor sub 208 or any other weight sensor known to those skilled in the art.

In some embodiments, the method 400 may further include measuring the drill bit 114 toolface direction in conjunction with steering aggression of the BHA 104 at the new depth, as at 408. At new depth point $P_2$, for example, and in view of the recently obtained new borehole 300 measurements, as at 406, the operator may know how aggressive the steering of the BHA 104 may need to be to reach a certain destination and therefore may be able to estimate or predict the borehole curvature over the next course length (i.e., from $P_2$ to $P_3$). Using the rotary steerable tool 202, the drill bit 114 toolface may be adjusted to whatever aggressiveness is required to reach the predetermined destination of $P_3$. Based on such steering aggressiveness, the operator may be able to estimate changes in inclination or azimuth of the borehole 300, and therefore the curvature change of the same. As described above, such predicted borehole 300 curvature may be estimated using the MAXBHA™ program or any other weight and torque corrective models method known to those skilled in the art. Until the BHA 104 actually reaches the point $P_3$, the prediction or "guess" on the curvature is relied upon.

The method 400 may also include measuring various borehole 300 parameters while the BHA 104 advances within the borehole 300. For instance, the method 400 may include measuring the torque (TOB) over the course of the interval, as at 410. More particularly, the TOB may be measured progressively as the BHA 104 advances from point $P_1$ to point $P_3$, as shown in FIG. 3B, and such measurements may used to update the curvature model. In one or more embodiments, as briefly mentioned above, the TOB may be measured using the sensor sub 208. In other embodiments, the TOB may be measured at the surface with surface-mounted torque sensors.

The method 400 may also include measuring pressure and flow rate over the course of the interval, as at 412. The flow rate of the mud through the drillstring 106 and its pressure are parameters or variables that may also affect sensor sub 208 measurements. Mud flow can exert a variety of hydraulic forces on the sensor sub 208, including, for example, fluid friction force and piston effects. Fluid friction force is caused by the difficulty of the first layer of fluid surrounding the surface of the BHA 104 to move across and through the roughness of the surface. BHA 104 piston effects, which impact tension or compression of the BHA 104, are caused by a reduction of cross-sectional flow area inside and/or outside of the flow path of the BHA 104 over the length of the drillstring 106 below the sensor sub 208. These hydraulic forces are primarily created by the pressure drop across the nozzles in the drill bit 114. However, other components in the BHA 104 can also impact the overall pressure drop of the drilling fluid between the sensor sub 208 and the bottom of the drill bit 114. On the outside of the BHA 104, mud rings, pack offs, formation sloughing/collapse, cuttings build-up or other flow restricting actions create upward compression forces on the BHA 104, whereas a pressure drop inside the BHA 104 between the sensor sub 208 and the drill bit 104 creates tension or stretch forces on the BHA 104.

As fluid flows over the surface of the BHA 104, either on the internal or external flow path, the first layer of fluid is generally slow-moving, as it is difficult for the fluid to move across and through the roughness of the surface. The effects of mud flow on the WOB measurement can be estimated by a variety of methods. For example, a direct measurement of the effects of the flow can be made without attempting to characterize the properties of the mud, which can be repeated to recalibrate the model when downhole conditions change. A more sophisticated model, however, can incorporate mud properties such as changes in friction and pressure drop due to changes in yield point, plastic viscosity, density, down hole temperature, % solids, etc. Other methods of determining the effects of mud flow include, for example, calculations based on geometries or surface finish.

In order to take a direct measurement of the effects of the mud flow on the sensor sub 208, one or more flow rate measurements can be made using measurement tools such as, for example, flow-line sensors or mud flow interfaces, and one or more sensor sub 208 measurements can be made using the sensor sub 208 itself. The measurements can then be plotted at their respective flow rates, and a curve-fitting equation can be extrapolated through the data points. This curve can subsequently be used to calibrate the sensor sub 208 as described above to remove the effects of changes in mud flow, without requiring a new tare measurement.

In an alternative embodiment, pipe pressure can be used instead of mud flow rate to achieve similar results, since flow rate and pipe pressure are interrelated. The above process with respect to pipe pressure would be identical, except that pressure measurements would be taken at specific flow rates, and the measured weight would be corrected based on changes in internal pipe pressure rather than flow rate. Pressure measurements can be taken, for example, using the MWD/LWD tool 204, as generally know in the art.

As flow paths wash or wear out, however, the pressure versus flow rate relationship can change with a drop in pressure at the same flow rate. Hence, a model using pipe pressure may be retested during long runs to verify that changes in pressure versus mud flow have not diverged significantly enough to affect the desired accuracy. Further, a pipe pressure model can be broadened to compensate automatically for variance in the pressure versus flow, which can be useful in situations with wear and/or changes in mud properties. For example, additives that are added to a mud system in large concentrations can cause drastic changes to the circulating pressure. These changes in pressure can occur as the additive circulates through the flow path, as mud systems are swapped, or as properties change as drilling proceeds. Increases in pressure can also occur as a result of pipe constriction.

In these instances, the pressure drop across the BHA 104 typically has the greatest impact on the z-axis force applied to the sensor as a result of mud flow. Hence, a higher or lower pressure can be observed for the same flow and thus less or more pipe stretching force, respectively. By changing the model to instead respond to changes in pipe pressure near the sensor, however, a more accurate model can be obtained that is more immune to changes in force due to changes in mud properties. Exemplary configurations for making measurements for flow rate and pipe pressure may be found in co-owned U.S. patent application Ser. No. 13/518,769 entitled "System and Method for Automatic Weight-on-Bit Sensor Calibration," the contents of which are hereby incorporated by reference in their entirety.

Still referring to FIG. 4, the method 400 may further include calculating the predicted curvature, inclination, and azimuth at the drill bit 114, as at 414. The predicted curvature may encompass the predicted curvature of the borehole 300 from $P_2$ to $P_3$, as shown in FIG. 3A. In one or more embodiments, such a calculation may be derived or otherwise determined using the Minimum Curvature Method as discussed above, and implemented using, for example, the MAXBHA™ software or the like. Some parameters that the MAXBHA™, or similar borehole predictive program, may take into account include, but are not limited to, the type of rock being drilled into, speed of the drill bit 114, stiffness of the BHA 104 (including how many contact points with the wall of the borehole 300 there are), the amount of bend angle in the BHA 104, combinations thereof, and the like.

Once the predicted borehole curvature is determined and otherwise logged, the method 400 may include calculating new weight and/or torque correction values using the predicted borehole curvature, as at 416. In some embodiments, the new weight and/or torque values may take into account such borehole parameters as flow rate, pipe pressure, and predictive curvature. In other embodiments, the new weight and/or torque values may take into account gravity or drag effects which could also significantly affect WOB and TOB measurements as obtained by the sensor sub 208.

In some embodiments, a correction value for drag effects may be determined using the "true" weight $F_g$ of the mass below the sensor sub 208, the projected hole inclination $I_n$, and friction. In at least one embodiment, the correction value may be equal to the drag force $F_{dn}$, which corresponds to a net axial force applied to the sensor sub 208 as a result of drag. The drag force $F_{dn}$ represents the contact force of the BHA 104 against the bore wall below the sensor sub 208. As can be appreciated, the drag force $F_{dn}$ will increase as the borehole curvature or predicted borehole curvature increases. Hence, the drag force $F_{dn}$ is a function of the dynamic coefficient of friction and the applied force against the borehole wall, and can be represented by the following equation:

$$F_{dn} = \mu_{dg} \times F_g \times \sin(I_n) \qquad \text{Equation (5)}$$

where $\mu_{dg}$ is the dynamic coefficient of friction between the borehole wall and the BHA 104, $F_g$ is the gravitational force applied to the mass below the sensor sub 208 in a vertical free hanging position, and $I_n$ is the inclination of the drill bit 114 at a predicted position in the borehole. The dynamic coefficient of friction $\mu_{dg}$ is used in Equation (5) rather than the static coefficient of friction, since it will take into account the effects of axial friction while the drillstring 106 pipe is being moved.

The dynamic coefficient of friction $\mu_{dg}$ can be determined by a variety of methods. For example, the change in force from the static to the dynamic can be measured while dragging the drillstring 106 to determine the drag force. For rotary steerable tools, such as the rotary steerable sub 202 of FIG. 2, where the bend can be adjusted, the bend can be set to 0% and the drag test performed in a straight section of the borehole where there is no interference between the BHA 104 and the borehole wall. Alternatively, the dynamic coefficient of friction due to gravity $\mu_{dg}$ can be estimated by analyzing tripping data from the sensor sub 208.

In general, it can be assumed that the magnitude of the drag force $F_{dn}$ is the same in both directions, although it may be different in reality due to discontinuities or upset diameters (i.e., larger than normal diameters used for tool joint connections or to add weight) in the shape of the BHA 104. Depending on the direction of movement, however, the drag force $F_{dn}$ can be either positive or negative due to the storage of potential energy through compression or extension of the BHA 104. For purposes of the description herein, however, the drag force $F_{dn}$ is treated as positive if movement is in the downward direction, because it is causing the BHA 104 to compress. If movement is in the upward direction, the drag force $F_{dn}$ is treated as negative, since it is causing the BHA 104 to stretch. The directionality of the movement of the drillstring 106 can be monitored at the surface 110 (FIG. 1) or can be determined by down hole equipment such as, for example, a depth sensor as part of the MWD/LWD tool 204.

Thus, a "true" WOB $F_{WOBn}$ without the effects of drag in view of predicted hole curvature can be calculated by subtracting the drag force $F_{dn}$ (here equal to the correction value) from a measured weight $F_{zn}$, such as is shown in the below equation:

$$F_{WOBn} = F_{zn} - \mu_{dg} \times F_g \times \sin(I_n) \qquad \text{Equation (6)}$$

where $F_{zn}$ is a z-axis measured WOB at the predicted point in the borehole. Thus, the sensor sub 208 may be calibrated using this correction value (here equal to the drag force $F_{dn}$).

The drag force $F_{dn}$, taking into account both inclination and azimuth of the projected or measured borehole curvature, may be calculated using the following equation:

$$F_{dn} = \mu_{dg} \times F_n \qquad \text{Equation (7)}$$

where $F_n$ is the side force or normal force that the drill string 106 or BHA 104 applies on the wall of the borehole as a result of being bent to the curvature of the borehole. The normal force $F_n$ may be calculated using the following equation:

$$F_n = \sqrt{(F_e \Delta\alpha \sin\theta_{avg})^2 + (F_e \Delta\theta + W_b \sin\theta_{avg})^2} \qquad \text{Equation (8)}$$

where $F_e$ is the axial force at the bottom of the drill string 106 section calculated using the buoyancy method, i.e., effective tension calculation; $W_b$ is the buoyed weight of the section ($W_b = w_b S_L$, where $w_b$ is the buoyed weight per unit length of the drill string 106 section and $S_L$ is the drill string 106 section length), $\Delta\alpha$ is the change in azimuth over the section length, $\theta_{avg}$ is the average inclination over the section, and $\Delta\theta$ is the change in inclination over the section length. The sign in front of the term $W_b$ is based on whether the wellbore is building or dropping. The tension is working against the weight vector for a build section and with the weight vector for a drop section of the well profile.

The method 400 may further include revising the measured weight and/or torque values with corresponding correction values, as at 418. In other words, the sensor sub 208 may be re-calibrated with the correction values such that the WOB and TOB measured values may be zeroed out and a tare may be applied to the weight and torque measurements in order to substantially remove the effects of predicted borehole curvature.

At this point, the drillstring 106 has advanced from $P_2$ to $P_3$, as in FIG. 3A, and the old $P_3$ becomes a new $P_2$, as in FIG. 3D. The operator may have at this time the option of taking an additional survey measurement at $P_3$, as at 420. If the operator opts to bypass the additional survey, the method 400 may return to drilling an additional interval, as at 404, and the iterative process discussed above may be repeated. However, if the operator opts to take the additional survey, the method 400 may include recording new inclination and azimuth values at the new depth, as at 422. The distance to the bottom of the BHA 104 from the survey probe 207 is P3−P2, as in FIG. 3D. This is the minimum distance the operator has to move the drillstring 106 to equal the length of the BHA 104 from the survey probe 207 to the bottom of the drill bit 114.

With the new inclination and azimuth values, the true curvature of the borehole 300 between the prior survey stations may then be able to be calculated, as at 424. With the true curvature determined, the weight and/or torque correction data for the course length between the prior survey stations may be reprocessed or otherwise reassessed, as at 426. In other words, since more accurate data is now available, the predictive corrections applied to the raw weight and torque data may now be discarded and the reprocessed values applied to the model. While there are several ways to do this calculation, as recognized by those skilled in the art, at least one way is to correct gravity effects by performing a numerical integration by the summation of discrete intervals of measured depth versus the axial contribution of weight due to gravitational forces on the BHA 104. Specifically, using interpolation and/or numerical integration over small segments of the borehole 300, the effects on WOB as measured by the sensor sub 208 over the borehole curvature may be determined using the Minimum Curvature Method, as generally described above.

In some embodiments, this involves calculating an interpolated inclination value for the points between the survey stations and then using that inclination to calculate the axial weight contribution of the BHA 104 for that delta interval of measured depth. The changes of inclination over the course length may be integrated against either an average weight per unit length of BHA 104 or a more sophisticated model of the weight distribution along the length of the BHA 104 based upon features of the BHA 104 to arrive at an integrated sum of the net effect due to gravity. Likewise, the curvature of the borehole 300 over the course length would be used to calculate the friction (i.e., drag effects) that the BHA 104 experienced due to bending along the course length. Previous estimations for this interval used by the predictive model will then be discarded and this updated correction may then be re-applied to the raw weight data as measured over the course length.

Using the Minimum Curvature Method calculations to determine the inclination at each delta measured depth is a simple way to ascertain the localized inclination of the borehole 300 below the last survey station. In general, the Minimum Curvature Method makes a generalized averaging of a smooth change of inclination over said interval. However, a more accurate method may be to monitor the drill bit 114 toolface and steering intensity over this interval and calculate the predicted change in inclination based upon discrete measurements made over the interval, as briefly discussed at 408. Such a method may result in a series of interconnected micro doglegs and/or straight intervals that all add up to the final inclination value.

The key to both methods is the assumption that the unknown inclination between the last survey station and the drill bit is predictable within a certain error limit. Making reasonable assumptions on what the error limits are based upon prior historical performance results for the BHA 104 and the formation being drilled in may give the user a general understanding of how accurate the predicted values may be.

In some embodiments, the contribution of only a portion of the BHA 104 effects on the weight measurement may be added up, instead of the entire interval or course length. In such embodiments, additional error may be assumed and an error factor may be introduced into the model to account for the uncompensated length. For instance, rather than predicting curvature and its effects on the several borehole parameters all the way down to the bottom of the drill bit, it is also contemplated herein to stop a short distance from the bottom of the drill bit 114 and nonetheless obtain a reasonable prediction value. Accordingly, it will be appreciated that the disclosed method 400 is merely a guide to the general process of predicting, measuring, and reassessing, with the understanding that even a partial length correction is supportive to the process in auto-correcting.

At this point, the method 400 may return to drilling an additional interval, as at 404, and the iterative process discussed above repeats. It will be appreciated that the range of complexity of the method 400 may be scalable with the assumption that the more variables introduced (i.e., borehole parameters being measured or otherwise taken into account), the more accurate the curvature prediction may be.

Figure 5:
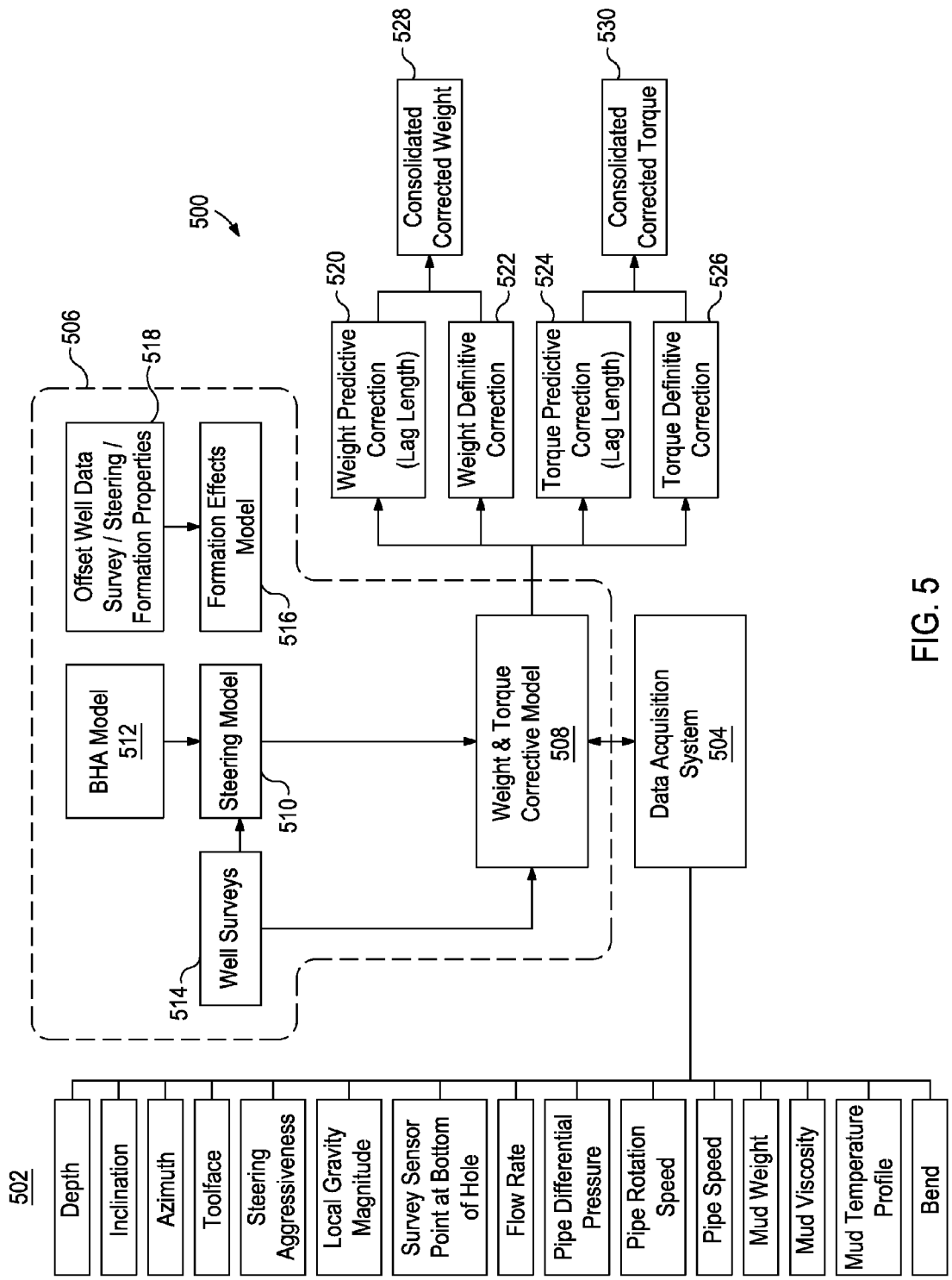
FIG. 5 illustrates a simplified schematic diagram of a system that may be configured to execute the methods described herein, according to one or more embodiments.

Referring now to FIG. 5, with continued reference to the previous figures, illustrated is a simplified schematic diagram of a system 500 that may be configured to execute the methods described herein, according to one or more embodiments. As illustrated, the system 500 may be configured to obtain or otherwise determine a plurality of borehole parameters or measurements 502 using the various sensors and devices of the BHA 104 and/or sensors arranged at the surface 110 (FIG. 1). For instance, the depth may be measured at the surface 110, the inclination and azimuth measurements may be obtained using the survey probe 207 of the MWD/LWD tool 204, the toolface measurement may be obtained using the survey probe 207, the steering aggressiveness may be measured with sensors associated with the rotary steerable tool 202, the local gravity magnitude may be measured with a gravitometer or the like, the survey pointing at the bottom of the borehole may be measured with a near bit inclination sensor, the flow rate may be measured either at the surface 110 or downhole, the pipe differential pressure may be measured downhole with the MWD/LWD tool 204, the pipe rotation and speed may be measured at the surface 110, the mud weight, viscosity, and mud temperature profile may each be measured at the surface 110, and the bend of the BHA 104 may be measured with the sensor sub 208 and/or at the surface 110. As briefly mentioned above, the range of complexity of the methods disclosed herein may be scalable such that the more borehole parameters being measured or otherwise taken into account, the more accurate the resulting curvature prediction will be.

The system 500 may further include a data acquisition system 504 that may be configured to receive and process the measurements 502. In some embodiments, the data acquisition system 504 may be arranged at a downhole location, but in other embodiments, the data acquisition system 504 may be arranged at the surface 110. The bi-directional communications module 210 of FIG. 2 may be communicably coupled to the data acquisition system 504 and thereby may be able to provide valuable borehole parameter data and measurements to the data acquisition system 504 from the BHA 104. The data acquisition system 504 may be configured for wired or wireless telecommunications and is discussed in greater detail below with reference to FIG. 6.

The system 500 may further include a predictive modeling system 506 used to receive and process borehole parameter data and determine, calculate, or otherwise predict borehole position and curvature. In some embodiments, the predictive modeling system 506 may encompass or otherwise include the MAXBHA™ software program or platform, as discussed above. In other embodiments, however, the predictive modeling system 506 may encompass or include any other software program or platform useful in modeling borehole position and curvature.

In some embodiments, the predictive modeling system 506 may include a weight and torque corrective model 508 having one or more processors configured to process the incoming data and provide various outputs, as discussed below. For instance, the weight and torque corrective model 508 may be configured to communicate with the data acquisition system 504 and thereby obtain the measurements 502 and update the predictive model using said measurements 502. When any "true" or known data is obtained, the predictive modeling system 506 may be configured to reassess the predictive model and provide a more accurate prediction of borehole curvature. The weight and torque corrective model 508 may also receive data from a steering model 510 which may be configured to predict the change in the weight and torque of the BHA 104. In determining the predicted changes in weight and torque, the steering model 510 may take into account or otherwise receive data from a BHA model 512, various well surveys 514, and a formation effects model 516.

The BHA model 512 may be configured to provide geometry parameters of the BHA 104 to the steering model 510 and thereby provide performance data related thereto. The well surveys 514 may be obtained in real-time and constantly updated as the drilling process progresses. Updated well surveys may either be provided to the steering model 510 such that the steering model 510 is constantly updated and reassessed, or otherwise the well surveys may be directed to the weight and torque corrective model 508 for updating and reassessing parameters of the model therein accordingly.

The formation effects model 516 may provide data related to the compressive strength of the rock, the chemical reactivity of the rock, etc., all of which could affect steering aggressiveness. In some embodiments, the formation effects model 516 may obtain information from offset well data survey/steering/formation properties 518 which may include logged or stored information about the particular formation or rock being drilled into. For example, prior directional drillers may have taken measurements or run diagnostics in the same formation, or a similar rock formation, and various formation parameters may thereby be obtained such as, but not limited to, probable build and turn rates, steering performance in such formations, formation properties, and the like. Accordingly, the offset well data survey/steering/formation properties 518 may be able to update the formation effects model 516 with such data such that a more accurate depiction of the formation/rock being drilled into may be provided to the steering model 510.

Using portions of both the predictive and true data, the predictive modeling system 506 may be configured to provide a weight predictive correction 520 and a torque predictive correction 524. The weight and torque predictive corrections 520, 524 may take into account lag length and may be based upon the predicted or true borehole curvature as processed by the predictive modeling system 506. Once the true weight and torque are known, or otherwise determined through the various real-time measurements 502, the predictive modeling system 506 may be configured to determine or otherwise calculate a weight definitive correction 522 and a torque definitive correction 526. By combining the predictive and definitive measurements 520-526 provided by the predictive modeling system 506, consolidated corrected weight and torque data 528, 530 may be derived. In other words, combining the predictive and definitive calculations 520-526 may update or otherwise reassess the weight and torque predictive measurement such that a more accurate prediction is provided and the predictive model may more accurately represent the effects of gravity and drag effects due to true and/or predicted borehole curvature.

The exemplary systems and methods disclosed herein may also be useful in determining or otherwise assessing buckling of a drillstring, such as the drillstring 106 of FIGS. 1 and 2. The drillstring 106 naturally follows the borehole curvature as it advances into the formation. When it deviates by a certain amount, buckling can occur. Buckling dynamics of a drillstring are basically a function of hole diameter, pipe diameter, and pipe stiffness which is related to the yield point of the string material and its Young's modulus. Buckling can eventually lead to kinking of the drillstring 106, and kinking can result in spiraling of the drillstring 106 within the borehole which could potentially bind or jam drilling operations.

The modes of buckling are related to at least three phases as the weight on the drillstring 106 increases in compression. First, at a minimal applied weight, the drillstring 106 may rotate as a generally straight pipe string having little to no lateral deformation within the borehole. Second, when the applied weight increases, buckling of the drillstring 106 may ensue and the drillstring 106 may begin to sinusoidally move side to side within the borehole. Third, increasing the applied weight even further may cause the drillstring 106 to "corkscrew" around the borehole as it takes on a helical shape.

According to some embodiments, the bending moment and bend measurements of the drillstring 106, as corresponding to the true and/or predicted borehole curvature, may be determined in order to detect buckling. Properly detecting buckling in the drillstring 106 may help avoid string fatigue failures, reduce damaging vibration modes that can lead to tool failures, and optimize weight transfer (i.e., WOB) to the drill bit 114. In some embodiments, optimizing the WOB may include keeping the normal and drag forces of the drillstring 106 minimized in view of the true and predicted borehole curvature, and thereby maximizing the rate of penetration based on weight contribution.

Referring again to FIG. 2, the sensor sub 208 may be configured to detect and otherwise measure bend (e.g., bending moment in polar magnitude) and bend direction of the BHA 104. In other embodiments, corresponding sensors at the surface 110 (FIG. 1), in conjunction with the sensor sub 208, may be adapted to cooperatively measure the twist of the drillstring 106, and thereby approximate the bending moment. In some embodiments, the bend direction may be measured relative to the high side of the borehole (e.g., magnetic high side). When the measured bend and/or bending moment surpasses a predetermined limit, that may be an indication of buckling of the drillstring 106.

Using the Minimum Curvature Method, as discussed above, the borehole curvature versus depth of the drillstring 106 may be determined. Using these calculations, the bending moment of the drillstring 106 versus depth as based on borehole curvature may also be determined. In operation, the bending moment of the BHA 104 may provide an indication as to where the BHA 104 is in the borehole with respect to a known or predicted curvature. For example, in areas of the borehole where increased bend or bending moment measurements are reported, that may be an indication of borehole curvature at that location. As such, the bend and bending moment measurements may prove advantageous in approximating the general shape of the borehole which, in turn, may also approximate the general shape of the drillstring as disposed within the borehole.

If the borehole curvature is known or otherwise predicted to arc in a particular direction at a certain point in the borehole, as determined by true or predictive measurements, the bending moment of the BHA 104 as sensed by the sensor sub 208 should correspond to that particular curvature. However, if the sensor sub 208 senses the drillstring 106 and BHA 104 arcing or otherwise bending in a different direction over that particular curvature, that may be an indication that the drillstring 106 is buckling or beginning to buckle. Accordingly, the sinusoidal or helical forms of buckling may be detectable based on the magnitude and direction of the bending moment, as detected by the sensor sub 208. As can be appreciated, the severity of the measured bending moment of the BHA 104 may inform an operator as to whether sinusoidal or helical buckling is occurring or about to occur. When buckling is determined, one or more corrective actions may be undertaken in order to reverse the buckling such as, but not limited to, reducing the WOB as applied from the surface 110, reducing the steering aggressiveness, and decreasing the rotational speed of the drillstring 106.

Figure 6:
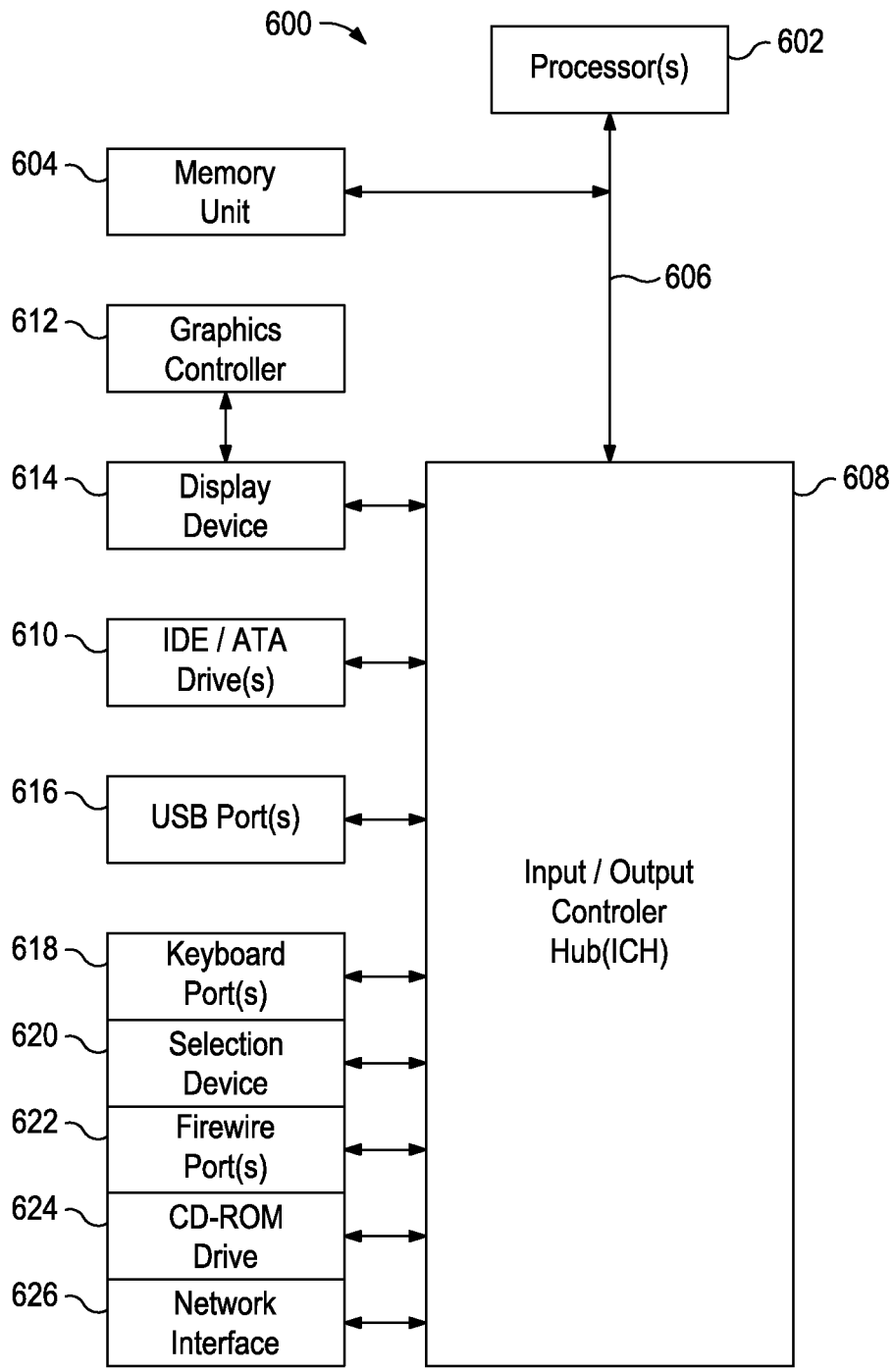
FIG. 6 illustrates a schematic data acquisition system configured to execute software for performing operations, according to one or more embodiments.

Referring now to FIG. 6, the data from the downhole and surface sensors may be processed and/or displayed using a data acquisition system 600, according to one or more embodiments. The data acquisition system 600 may be substantially similar to the data acquisition system 504 of FIG. 5. The processor components that process such data may be downhole and/or at the surface 110 (FIG. 1). For example, one or more processors in a downhole tool may process the downhole data. Alternatively or in addition, one or more processors either at the surface 110 and/or at a remote location may process the data. Moreover, the processed data may then be numerically and graphically displayed, as further described below.

The data acquisition system 600 may be configured to execute software for performing operations, according to some embodiments of the disclosure. The data acquisition system 600 may be representative of various components. For example, the data acquisition system 600 may be representative of parts of the BHA 104, a computer local to the rig site, a computer remote to the rig site, etc.

As illustrated in FIG. 6, the data acquisition system 600 may include processor(s) 602. The data acquisition system 600 may also include a memory unit 604, processor bus 606, and Input/Output controller hub (ICH) 608. The processor(s) 602, memory unit 604, and ICH 608 may be coupled to the processor bus 606. The processor(s) 602 may encompass any suitable processor architecture. The data acquisition system 600 may include one, two, three, or more processors, any of which may execute a set of instructions in accordance with embodiments of the disclosure.

The memory unit 604 may store data and/or instructions, and may include any suitable memory, such as a dynamic random access memory (DRAM). The data acquisition system 600 may also include IDE drive(s) 610 and/or other suitable storage devices. A graphics controller 612 controls the display of information on a display device 614, according to some embodiments.

The input/output controller hub (ICH) 608 may provide an interface to I/O devices or peripheral components for the data acquisition system 600. The ICH 608 may include any suitable interface controller to provide for any suitable communication link to the processor(s) 602, memory unit 604 and/or to any suitable device or component in communication with the ICH 608. In at least one embodiment of the disclosure, the ICH 608 provides suitable arbitration and buffering for each interface.

In some embodiments of the disclosure, the ICH 608 may provide an interface to one or more suitable integrated drive electronics (IDE) drives 610, such as a hard disk drive (HDD) or compact disc read only memory (CD ROM) drive, or to suitable universal serial bus (USB) devices through one or more USB ports 616. In at least one embodiment, the ICH 608 may also provide an interface to a keyboard 618, a mouse 620, a CD-ROM drive 624, one or more suitable devices through one or more firewire ports 622. In at least one embodiment of the disclosure, the ICH 608 may also provide a network interface 626 though which the data acquisition system 600 can communicate with other computers and/or devices.

In some embodiments, the data acquisition system 600 may include a non-transitory machine-readable medium that stores a set of instructions (e.g., software) embodying any one, or all, of the methodologies and/or processes described herein. Furthermore, software may reside, completely or at least partially, within the memory unit 604 and/or within the processor(s) 602. The term "computer-readable medium" or "machine-readable medium" should be taken to include a single medium or multiple media (e.g., a centralized or distributed database, and/or associated caches and servers) that store the one or more sets of instructions. The term "computer-readable medium" or "machine-readable medium" shall also be taken to include any medium that is capable of storing, encoding or carrying a set of instructions for execution by the machine and that cause the machine to perform any one or more of the methodologies and/or processes of the present disclosure. Moreover, the term "computer-readable medium" or "machine-readable medium" shall accordingly be taken to include, but not be limited to, solid-state memories, and optical and magnetic media.

It should be understood that the processes and techniques described herein are not inherently related to any particular apparatus and may be implemented by any suitable combination of components. Further, various types of general purpose devices may be used in accordance with the teachings described herein. It may also prove advantageous to construct a specialized apparatus to perform the methods described herein. Those skilled in the art will appreciate that many different combinations of hardware, software, and firmware will be suitable for practicing the present disclosure.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method for optimizing weight measurements in drilling operations, comprising:
    taking a first survey recording at a first depth within a borehole, the first survey recording providing inclination and azimuth of a drillstring at the first depth;
    measuring a weight on a drill bit at the first depth with a sensor sub arranged on a bottom hole assembly, the bottom hole assembly forming part of the drillstring and the drill bit being disposed at an end of the drillstring;
    calculating a predicted borehole curvature at a second depth within the borehole, the predicted borehole curvature being at least partially based on the inclination and azimuth of the drillstring at the first depth and a predicted inclination and a predicted azimuth of the drillstring at the second depth;

drilling an interval from the first depth to the second depth along the predicted borehole curvature;
measuring the weight on the drill bit in real-time as the drillstring moves along the interval;
calculating a weight correction value based on the predicted borehole curvature;
calibrating the sensor sub with the weight correction value;
reprocessing the weight correction value based on the predicted borehole curvature as the drillstring moves along the interval; and
re-calibrating in real-time the sensor sub with the reprocessed weight correction value as the drillstring moves along the interval.

2. The method of claim 1, further comprising:
taking a second survey recording at the second depth, the second survey recording providing the inclination and azimuth of the drill string at the second depth;
calculating a true borehole curvature using the change in inclination and azimuth between the first and second depths; and
reprocessing the weight correction value based on the true borehole curvature.

3. The method of claim 2, further comprising:
measuring bend of the bottom hole assembly with the sensor sub; and
detecting buckling of the drillstring when the bend of the drillstring bends against the true borehole curvature.

4. The method of claim 1, further comprising:
measuring bending moment of the bottom hole assembly with the sensor sub; and
detecting buckling of the drillstring when the bending moment surpasses a predetermined limit.

5. The method of claim 1, further comprising:
measuring a torque on the drill bit at the first depth with the sensor sub;
calculating a torque correction value based on the predicted borehole curvature; and
calibrating the sensor sub with the torque correction value.

6. The method of claim 5, further comprising:
drilling the interval from the first depth to the second depth based on the calculated torque correction value;
measuring the torque on the drill bit in real-time as the drillstring moves along the interval;
reprocessing the torque correction value based on the predicted borehole curvature as the drillstring moves along the interval; and
re-calibrating the sensor sub in real-time with a reprocessed torque correction value as the drillstring moves along the interval.

7. The method of claim 6, further comprising:
taking a second survey recording at the second depth, the second survey recording providing the inclination and azimuth of the drill string at the second depth;
calculating a true borehole curvature using the change in inclination and azimuth between the first and second depths; and
reprocessing the torque correction value based on the true borehole curvature.

8. The method of claim 1, wherein the weight correction value is determined using at least one of gravity and drag effects as acting on the drillstring.

9. The method of claim 8, wherein, as the predicted borehole curvature increases, the drag effects on the drill string increase.

10. A non-transitory, computer readable medium programmed with computer executable instructions that, when executed by a processor of a computer unit, performs the method of claim 1.

11. A system for optimizing weight measurements in drilling operations, comprising:
a bottom hole assembly coupled to a drillstring extended into a borehole;
one or more survey probes arranged on the bottom hole assembly and configured to take a first survey recording at a first depth within the borehole, the first survey recording providing inclination and azimuth of the drillstring at the first depth;
a sensor sub arranged on the bottom hole assembly and configured to measure a weight on the drill bit at the first depth;
a data acquisition system communicably coupled to the one or more survey probes and the sensor sub and able to receive and process the first survey recording and the weight on the drill bit; and
a weight and torque corrective model communicably coupled to the data acquisition system and having one or more processors configured to calculate a predicted borehole curvature at a second depth within the borehole, the predicted borehole curvature being at least partially based on the inclination and azimuth of the drillstring at the first depth and a predicted inclination and azimuth of the drillstring at the second depth, the one or more processors being further configured to calculate a weight correction value based on the predicted borehole curvature, the weight correction value being used to calibrate the sensor sub.

12. The system of claim 11, wherein the weight and torque corrective model is updated with real-time weight on the drill bit measurements while drilling an interval from the first depth to the second depth and further configured to reprocess the weight correction value as the drillstring moves along the interval, thereby re-calibrating the sensor sub with a reprocessed weight correction value.

13. The system of claim 11, wherein the weight correction value is determined using at least one of gravity and drag effects as acting on the drillstring.

14. The system of claim 13, wherein, as the predicted borehole curvature increases, the drag effects on the drill string increase.

15. The system of claim 11, wherein the weight and torque corrective model receives data from a steering model configured to predict a change in the weight of the bottom hole assembly.

16. The system of claim 11, wherein the sensor sub is configured to measure bend of the bottom hole assembly to detect buckling of the drillstring.

17. The system of claim 11, wherein the sensor sub is configured to measure bending moment of the bottom hole assembly to detect buckling of the drillstring when the bending moment surpasses a predetermined limit.

18. The system of claim 11, wherein the sensor sub is configured to measure a torque on the drill bit at the first depth and the weight and torque corrective model is configured to calculate a torque correction value based on the predicted borehole curvature, the torque correction value being used to calibrate the sensor sub.

19. The system of claim 18, wherein the weight and torque corrective model is configured to reprocess the weight and torque correction data once a second survey recording is taken at the second depth and a true borehole curvature is calculated.

20. The system of claim 11, wherein the data acquisition system is arranged outside of the borehole.

21. The system of claim 11, wherein the data acquisition system is arranged within the borehole.

* * * * *